United States Patent [19]

Wirth et al.

[11] Patent Number: 5,599,625
[45] Date of Patent: Feb. 4, 1997

[54] PRODUCTS HAVING MULTIPLE-SUBSTITUTED POLYSILOXANE MONOLAYER

[75] Inventors: Mary J. Wirth, Elkton, Md.; Hafeez O. Fatunmbi, Newark, Del.

[73] Assignee: Research Corporation Technologies, Inc., Tucson, Ariz.

[21] Appl. No.: 455,875

[22] Filed: May 31, 1995

Related U.S. Application Data

[63] Continuation of Ser. No. 90,053, Jul. 15, 1993, abandoned, which is a continuation-in-part of Ser. No. 900,215, Jun. 17, 1992, abandoned.

[51] Int. Cl.$^6$ ..................................................... B32B 17/10
[52] U.S. Cl. ........................ 428/391; 428/405; 428/447; 73/19.02; 73/23.35; 210/656; 210/198.2; 95/88; 427/220; 427/287; 427/387; 427/299

[58] Field of Search ...................... 428/405, 391, 428/447; 73/19.02, 23.35; 210/656, 198.2; 95/88; 427/220, 287, 387, 299

[56] References Cited

U.S. PATENT DOCUMENTS 5,209,976  5/1993  Ogawa ..................................... 428/391

*Primary Examiner*—Margaret W. Glass
*Attorney, Agent, or Firm*—Scully, Scott, Murphy & Presser

[57] ABSTRACT

A protective monolayer is formed on e.g. silica gel and glass surfaces comprising a monolayer of silicon and oxygen atoms which is substituted with first and second hydrocarbyl substituents.

55 Claims, No Drawings

PRODUCTS HAVING MULTIPLE-SUBSTITUTED POLYSILOXANE MONOLAYER

This is a continuation of application Ser. No. 08/090,053, filed on Jul. 15, 1993, now abandoned, which is a continuation in part of U.S. application Ser. No. 07/900,215 filed on Jun. 17, 1992, now abandoned.

The present invention relates to providing specialized polysiloxane coatings to articles. The coatings provide protective attributes to the substrates bearing the coatings, without loss of and in some cases with enhancement of the desirable properties of the substrates.

The present invention relates in particular to the formation of specialized siloxane monolayers on substrates which are susceptible to damage upon exposure to acidic environments or basic environments, or which are vulnerable to physical degradation such as cracking. The invention relates in particular to the provision of such monolayers on silica-based chromatographic supports, in order to protect such supports from damage due to the ambient chemical environment while retaining the desirable chromatographic properties of the support. The invention also relates to providing such monolayers to glassware and glass surfaces, to provide desired protection as described hereinbelow.

While it has generally been known to apply "silicone" coatings to articles to impart various protective properties, such as waterproofing, it is believed herein to be novel to adjust the substituents on the silicon atoms making up such coatings in order to favorably affect the properties of the coating and of the articles bearing the coating. In addition, providing such adjustment on "coatings" which are in reality monolayers of siloxanyl (that is, —Si—O—) based monolayers is believed to be all the more novel.

Chromatographic packings can comprise silica gel to which organic substituents, such as alkyl chains, have been attached. It has heretofore been accepted that the susceptibility of such materials to attack by acids or bases has been an unavoidable concomitant of the packing's ability to perform properly in chromatographic applications. Thus, modification such as that which is the subject of the present invention has not been considered.

Indeed, formation of a siloxanyl monolayer might be expected to interfere with properties such as chromatographic capabilities because it would alter the shape and size of pores and would affect other surface characteristics.

For instance, a published abstract with respect to Japanese Patent Application No. 61287444 describes porous silica particles characterized in that the inner surfaces of the pores carry a hydrophobic layer formed by a reaction of the silica in the pore with an alkyl or aryl halosilane, among which are listed octadecyltri-chlorosilane and propyltrichlorosilane, among others, wherein the remaining exposed surface of the silica particle is bonded to hydrophilic groups such as ethylene glycol, glycerol, sorbitol, polyethylene oxide, glycidoxypropyltrimethoxy-silane, ethyleneglycol-mono-ethylether, or diethyleneglycol. The abstract does not disclose the formation of a siloxanyl monolayer, nor is there disclosed any intimate intermingling of different substituents on adjacent silicon atoms; indeed, such a product would be directly contrary to the teachings of this abstract which requires substituents of various types at quite distinct locations on the silica particle.

A number of other sources disclose bonding various substituents to an oxide surface, particularly a silica surface, but none discloses or suggests providing multiple distinct substituents at adjacent or nearly adjacent sites on a siloxanyl monolayer. Examples wherein the substrate is glass or a chromatographic surface include U.S. Defensive Publication T958,010, U.S. Pat. Nos. 4,755,294, 4,604,207, and 4,512, 898. Other publications examining the formation of alkyl-substituted siloxanyl monolayers on silica gel are typified by P. Silberzan, et al., in Langmuir, Vol. 7, No. 8, pp. 1647–1651 (1991) and S. Wasserman, et al., in J. Am. Chem. Soc., Vol. 111, No. 15, pp. 5852–5861 (1989).

Briefly stated, one aspect of the present invention is a product to which is chemically bonded a monolayer of silicon atoms which are connected to other silicon atoms in said monolayer through oxygen atoms in said monolayer, wherein the monolayer is substituted with a first hydrocarbyl substituent and a second hydrocarbyl substituent and each of the silicon atoms in said monolayer is substituted with said first hydrocarbyl substituent or said second hydrocarbyl substituent, wherein said first hydrocarbyl substituent is longer than said second hydrocarbyl substituent.

In another aspect of the present invention, the product is silica gel or another inorganic oxide, or a substrate whose surface is silica gel or such other inorganic oxide, and the first and second hydrocarbyl substituents are selected such that the substrate bearing the substituted monolayer is useful as, for instance, a chromatography column, and exhibits a high degree of resistance to acidic and basic attack. Yet another aspect of the present invention is the use of such a product in chromatography.

Yet another aspect of the present invention is glass, such as glass articles, glassware, glass optical fibers, glass capillaries, and the like, bearing the monolayer described herein, wherein the monolayer protects the surface of the glass from acidic and basic environments and from physical degradation such as cracking.

While the present invention is particularly useful in the preparation of products comprising silica which bears the monolayer described herein, the present invention is believed to be useful in providing the indicated protection against chemical degradation to a large variety of materials. Stated generally, any product having a surface which reacts with alkyl trichlorosilane to bond to the silane, can be provided with a monolayer in accordance with the present invention. Preferred materials are characterized in that they comprise surface oxygen. By "surface oxygen" is meant that the material contains, at its surface, oxygen which is covalently (or, in certain embodiments, ionically) bound in the material, which oxygen is capable of being covalently bonded to silanes. More specifically, the surface oxygen is considered within the scope of this aspect of the invention if the oxygen reacts with any alkyl trichloro-silane to form O—Si bonds.

Preferred materials to which the monolayer is applied include silica gel, silica-based glass and glassware, and optical "fiber optic" cable, as well as materials comprising oxides or mixed oxides of any inorganic material whose oxide is solid at standard temperature and pressure. Also included are carbonates, aluminosilicates, silicates and phosphates, of any inorganic cation. Also included are materials in which two or more of these are chemically combined or physically blended. Examples of the foregoing include inorganic pigments, limestone and clays (which typically comprise aluminosilicates). Additional examples include any inorganic element and oxides thereof so long as the surface thereof is capable of forming bonds to silicon atoms in the monolayer. Examples include but are not limited to alumina, zirconia, beryllia, titanium dioxide, magnesium oxide, and oxides of vanadium, chromium, manganese, iron, cobalt, nickel, copper, zinc, gadolinium, germanium, arsenic, rubidium, strontium, yttrium, niobium, molybdenum, ruthenium, rhodium, platinum, gold, silver, thallium, lead and bismuth.

One preferred embodiment of the present invention is silica gel or a substrate of a different material having a silica gel surface. The monolayer provides a protective layer to the silica gel.

The invention finds particular usefulness in chromatographic applications, including not only silica-based chromatographic supports but also metal-oxide chromatographic substrates.

Another preferred embodiment of the present invention is glass articles, such as glassware, capillary tubes, optical fibers, windows and windshields (whether for conventional construction and vehicular applications or more specialized uses in reactors and spacecraft), and any other article having a glass outer and/or inner surface. Providing the monolayer to glassware will help protect against acidic and basic environments, and will help resist the microscopic chemical and mechanical processes at the glass surface that help initiate and propagate cracking and related degradation. Providing the monolayer to optical fibers and inner spaces such as capillaries will likewise protect the inertness of the glass surface to acidic and basic attack and to mechanical degradation. Capillary tubes thus treated are useful in capillary chromatography and capillary electrophoresis.

Of particular interest is the embodiment wherein a surface comprising zirconium oxide (per se or alloyed) is treated in accordance with the present invention to provide protection from the aggressive environment to which the zirconium-based materials are exposed when they are used as moderators in pressured-water nuclear power reactors. Preferred groups to provide on such an oxidic surface are lower alkyl, such as methyl, and di-dydroxy lower alkyl, such as $HOCH_2$—$CH(OH)$—$CH_2$—.

As indicated, the monolayer is formed of silicon atoms bound to the substrate surface and connected to each other through single oxygen atoms. In addition, the monolayer is characterized in that it is substituted with the first and second hydrocarbyl substituents described herein. Each of the silicon atoms forming the monolayer is substituted with either a first hydrocarbyl substituent or a second hydrocarbyl substituent. In the broadest aspect of the present invention, there may be regions of the monolayer in which the first hydrocarbyl substituent predominates, even to the exclusion of the second hydrocarbyl substituent, and vice versa. However, in the preferred embodiment the first and second hydrocarbyl substituents are both distributed essentially uniformly across the surface of the monolayer. While it will be recognized that totally unvarying distribution of the first and second substituents on the monolayer may not be achieved, the product will generally preferably be characterized in that each of the first and second substituents are distributed essentially uniformly, or as nearly uniformly as possible, on the surface of the monolayer. In that way, the relative proportions of the first and second substituents will be essentially constant at any region on the monolayer.

The first and second hydrocarbyl substituents are preferably selected to optimize the property or properties desired of the product which will bear the monolayer, and to ensure the provision of a protective coating to the surface of the article. In the aspect of the present invention in which the desired property is the ability to carry out effective chromatographic separation when the article is used as a packing material for, e.g., HPLC or other gas-phase chromatography, the first hydrocarbyl substituent should be one which assists in providing chromatographic separation when bound to a chromatographic support. Examples of such substituents will be familiar to those conversant with the field of chromatography, and are indeed quite numerous. Examples include phenyl; epoxide; alkyl, containing from 1 to 60 carbon atoms in the longest chain, preferably 1 to 30 and more preferably 3 to 18 atoms in the longest chain; monounsaturated alkylene containing 2 to 60 carbon atoms in the longest chain; or derivatives in which alkyl or monounsaturated alkylene containing up to 60 carbon atoms contains one or more (preferably up to 12) hetero linkages such as —O—, —N(R)—, —S—, —C(O)—, —SO$_2$—, —C(O)O—, —OC(O)—, —C(O)N(R)—, or —N(R)C(O)—. The phenyl, alkyl and alkylene may optionally be substituted with one or more of hydroxyl, halogen (particularly fluorine, chlorine or bromine, especially fluorocarbons), cyano, nitro, —COOH, —SO$_3$H, —N(R)(R), —R$^1$Si(R$^2$)$_{3-n}$(OH)$_n$ wherein n is 1, 2 or 3, wherein R$^1$ and R$^2$ are each alkyl, alkoxy or alkylene containing up to 6 carbon atoms, and preferably methyl, ethyl, methoxy or ethoxy; or straight or branched lower alkyl containing up to 6 carbon atoms (which lower alkyl may be substituted with any of the foregoing substituents), wherein R at each occurrence is hydrogen or alkyl containing 1 to 6 carbon atoms. Thus, —N(R)(R) can be amino, monoaklylamino, or dialkylamino. Thus, exemplary functional groups include diol (such as $HOCH_2$—$CH(OH)CH_2$—), polyamine, carboxylic acid, sulfonic acid, and (N-trimethoxysilylpropyl) polyethyleneimine.

A preferred first substituent is alkyl containing 2 to 24 carbon atoms, and more preferably octadecyl. Preferred embodiments in which the alkyl chain has a substituent are those in which the substituent is in the omega-position. Another preferred first hydrocarbyl substituent has terminal ethylenic unsaturation. Examples include $CH_2$=$CHCH_2$—, and more generally $CH_2$=$CH$—$(CH_2)_{1-24}$—. The unsaturated group is useful in that other molecules that react with —CH=CH$_2$ groups can be attached to the hydrocarbyl substituent at that site. Epoxide groups and hydride groups, when present attached to the hydrocarbyl substituents, can also serve as sites to which other molecules and functional groups can be attached. Examples of such molecules include ones that impart hydro-phobicity or color, or which serve as cladding for the surface of a glass filament fiber optic transmission line. Examples of the latter include $C_1$–$C_6$ acrylates and methacrylates.

The second hydrocarbyl substituent can also be any of the foregoing substituents, provided that the second hydrocarbyl substituent is shorter than the first hydrocarbyl substituent. Preferably, for chromatographic applications, the second hydrocarbyl substituent is sufficiently shorter than the first such that a chromatographic support prepared in accordance with the present invention having a given first hydrocarbyl substituent is essentially undistinguishable in its chromatographic properties from a conventional silica gel support to which is grafted the same given first hydrocarbyl substituent. When the first substituent is $C_{12}$–$C_{24}$ alkyl, the second substituent is preferably alkyl containing 1 to 6 carbon atoms and more preferably propyl. When the first hydrocarbyl substituent is relatively short, i.e., alkyl containing up to 6 carbon atoms, or phenyl, the second hydrocarbyl substituent is preferably a shorter alkyl chain (optionally substituted as described above) or may simply be hydrogen.

In applications of the present invention other than the preparation of chromatography supports, the first and second hydrocarbyl substituents can be chosen as appropriate to provide any other desired properties such as abrasion resistance, translucency, transparency, refractive index, light reflectivity (e.g., outside a fiber optic line), hydrophilicity, hydrophobicity, or rheology (for instance, of treated minerals or pigments in an emulsion or in an aqueous or non-aqueous liquid preparation). In all events, the monolayer prepared in accordance with the present invention will impart the product with the desired ability to resist chemical degradation in acidic and basic environments. The second hydrocarbyl substituent is preferably one which maximizes the ability of the monolayer to prevent penetration of acidic and basic substances and ions to the product surface. Preferred second hydrocarbyl substituents are thus alkyl groups containing up to 6 carbon atoms, optionally substituted with halogen (particularly fluorine) or with $C_{1-3}$ alkyl.

The relative amounts of the first and second hydrocarbyl substituents on the monolayer are readily adjustable, and should be selected to provide the desired properties of the product bearing the monolayer. For instance, for chromatographic applications it is generally preferred that the density of the first hydrocarbyl substituent be about 2 to about 3 micromoles per square meter of silica gel surface, which corresponds to about 20 percent to about 50 percent of the surface. This permits the second hydrocarbyl substituent to "space" the longer substituents from each other while still retaining the desired protection to the substrate and the desired chromatographic properties. Accordingly, the mole ratio of first hydrocarbyl substituent to the second hydrocarbyl substituent on the substrate when it is to be used as a chromatographic material will preferably comprise about 1:1 to about 1:4. It will be recognized that, depending on the property or properties desired, the mole ratio of the first hydrocarbyl substituent to the second hydrocarbyl substituent can range from as low as below 1:100 to as high as 100:1, or higher, although the beneficial effects of the second hydrocarbyl substituent "spacing" the first hydrocarbyl substituents from each other are less pronounced as the ratio of first to second hydrocarbyl substituents exceeds about 1:1.

As set forth more fully hereinbelow, the relative ratios of the reactants employed to form the desired monolayer have to be adjusted so as to provide the desired ratio of substituents on the monolayer, taking into account the fact that the reactants will usually react with the substrate at different rates. For instance, a smaller reactant such as propyltrichloro-silane reacts more quickly (and thus more of it reacts in a given period of time) than n-octadecyltri-chlorosilane. Thus, because of the differing reaction kinetics of each reactant, the ratio of one to another before reaction will usually not equal the ratio of one to another on the monolayer following reaction. The determination of the relative amounts of each reactant to use, in order to obtain a given ratio of chain lengths on the monolayer, is a straightforward matter for any particular choice of substrate and hydrocarbyl substituents.

Preparation of articles bearing the monolayers described herein is straightforward. The article having surface oxygen is preferably treated to remove extraneous materials which might interfere with the bonding of the silane reagent to the available oxygen. The surface of the article needs to be hydrated, as free water is essential to achieving the desired reaction between the silane and the surface oxygen. However, the surface need not and should not carry liquid water in amounts that would interfere with the desired interaction between the silane and the surface oxygen.

It has been determined that the amount of water present on the substrate surface affects the hydrocarbyl group density that is obtained upon the ensuing reaction, and that excessive amounts of reagent water lead to decreased hydrocarbyl substituent density. Accordingly, it is highly preferred that the amount of water present at the surface be that which affords the densities of 7 or greater, and more preferably 8 or greater, micromoles of hydrocarbyl substituents per square meter of substrate surface. That amount of water is generally about equal to the amount (on a mole basis) required by the silane reagents employed to form the monolayer. Adequate hydration can be provided by cleaning and drying the surface of the article to be treated and then exposing it to a humid atmosphere so as to allow a surface monolayer of water vapor to form on the article. Alternatively, adequate hydration can be provided by adding a known, pre-calculated amount of water to a polar solvent in which the hydrocarbyl substituents are provided to the reaction site.

One technique for applying the monolayer employs reactants in a liquid phase. According to this procedure, a solution of silanes of the formula $R^1SiX_3$ and $R^2SiX_3$ is formed in a solvent which is inert to both of these silanes and to the article with which the reaction will be carried out. In the foregoing formulas, $R^1$ is the first hydrocarbyl substituent, $R^2$ is the second hydrocarbyl substituent and X is a leaving group which is preferably chlorine, methoxy, or ethoxy. (If the second hydrocarbyl desired is hydrogen, the corresponding reactant is $SiHCl_3$.) Suitable solvents include alkanes which are liquid at room temperature and atmospheric pressure, such as n-hexadecane. The solvent is preferably scrupulously anhydrous, to prevent premature reaction of the silane with any trace amounts of water.

Then, the solution is applied to the surface on which formation of the monolayer is desired. Depending on the nature and size of the article, it can simply be immersed in the solution under a suitable inert gas blanket to ensure that no atmospheric water vapor interferes with the desired interaction between the article, the reagent surface water, and the silanes. No special catalysts or extreme reaction conditions need be observed; the silanation reaction generally proceeds to completion in a matter of hours. In general, it can be expected that slightly raising the temperature of the reaction mixture will accelerate the completion of the reaction. The progress of the reaction can be followed in any of a number of conventional ways, for instance by monitoring the formation of HX in the solution; when the concentration of HX stops increasing, the consumption of the silane has ceased.

Following the completion of the reaction, the thus treated material is removed from the solution, washed, and dried. It can then be handled and treated in accordance with techniques currently employed with analogous materials to which the monolayer has not been applied in accordance with this invention. For instance, silica gel treated in this manner can be incorporated into an appropriate column to permit its use as a chromatographic packing material. Then, any mixture desired to be treated or analyzed chromatographically is simply applied to the column in a wholly conventional manner.

The monolayer can also be applied in the vapor phase. The surface to be treated (following surface cleaning, as described above) is contacted with a vapor which comprises the silanes of the formula $R^1SiX_3$ and $R^2SiX_3$, wherein $R^1$, $R^2$ and X are as defined above. The vapor may consist entirely of these silanes, or it may contain, in addition to those silanes, any other reagent intended to be reacted with the substrate surface; and the vapor should contain sufficient reagent water vapor in appropriate relative amounts as described herein to provide the desired high density of hydrocarbyl group coverage. Also, the vapor may contain as well diluents or carrier gas components which will not react with the silanes nor with the surface. The vapor should be free of components which, if present, would undesirably react with the surface and interfere with the formation of the desired surface layer.

The silanes can be applied by placing the substrate in a chamber containing the silanes. Alternatively, for a substrate such as a fiber optic filament, the fiber can be drawn through such a chamber under conditions providing sufficient temperature, circulation of the silanes, and residence time in the chamber, such that the desired reaction at the substrate surface occurs. Such an application technique permits faster treatment times than applications from a liquid, because there is much less residual drag than is inherent in drawing a fiber through a liquid. This technique also permits incorporation of other components that would also be desirably applied to the surface. The vapor-phase reaction is preferably carried out at temperatures of about 100° C. to 140° C.

One advantage of the invention is thus that the chain length densities can be arbitrarily varied, depending on the final product and properties desired. Another advantage is that the final product exhibits no, or a reduced number, of residual geminal silanols (i.e. silicon with two hydroxyl groups).

When the treated material is a mineral or pigment, it can be subdivided and added into other desired compositions such as paints, cosmetic preparations, and the like.

It has also been determined that the hydrolytic stability of monolayers applied in accordance with this invention can be enhanced by a technique which converts residual silanol groups present to other more inert species. Such silanol groups (i.e., —Si—OH groups) may be present on the monolayer or on the substrate itself and are convertible at either site.

The hydroxyl group of the silanol group is converted via a two-step process to a group Z wherein Z is connected to the silicon atom by a Si—C bond. In the first step, the —OH group is replaced by a halide, preferably —Cl. In the second step, the halide is replaced with alkyl, preferably $C_1$–$C_6$ alkyl and more preferably methyl.

The first step is advantageously carried out by halogenating the silanated material bearing hydroxyl-substituted silicon atoms with a halogenating agent, under anhydrous conditions. A preferred halogenating agent is thionyl chloride ($SOCl_2$). Then, the halogenated intermediate that is thus formed is reacted with an alkylating agent, again under anhydrous conditions. The preferred alkylating agent is a Grignard reagent, preferably an alkylmagnesium bromide such as $CH_3MgBr$. The reaction product should then be washed to remove salt byproducts.

This procedure is particularly useful for "endcapping" material containing a surface of silicon and oxygen atoms, and material comprising a polysiloxanyl monolayer such as that obtained with the present invention, to ensure the absence of Si—OH groups on such surface or monolayer. The Si—C bond that is created is stable to hydrolytic attack.

The present invention will be illustrated in the following example. This example should be interpreted as illustrative, and not as imparting limitations to the scope of the present invention.

EXAMPLE 1

Preparation and characterization of a mixed, horizontally polymerized bonded chromatographic phase:

I. Preparation procedure for chromatographic packing material:

A solution was prepared by mixing n-octadecyltrichlorosilane ($CH_3(CH_2)_{17}SiCl_3$) and n-propyltrichlorosilane ($CH_3(CH_2)_2SiCl_3$) in a 4:1 volume ratio in anhydrous n-hexadecane. (Several other volume ratios of the octadecyl to the propyl derivatives in solution had been used, including 1:1, 2:1, and 3:1, 8:1 and 3:2; the 4:1 gave the chromatographic behavior that most closely resembled that of a conventional chromatographic material.) The n-hexadecane has been made anhydrous by passing it through a column of dry alumina and silica in a glove box having an atmosphere of nitrogen. The reagent was kept under the glove box in preparation for the reaction with 50 µm silica gel particles. These silica particles were cleaned in boiling, concentrated nitric acid and rinsed with ultrapure water, and dried under nitrogen. The surface of the silica particles was hydrated by exposure to the vapor of ultrapure water for one hour. After this exposure period, the n-hexadecane solution was mixed with the silica particles and allowed to react at room temperature, under nitrogen, for a period of one day. The resulting bonded silica particles were cleaned by pouring off the n-hexadecane and rinsing sequentially with n-hexane, toluene, acetone, and methanol. Some of this material was used to pack a chromatographic column for subsequent study with a commercial high performance liquid chromatograph, and some of the material was submitted for analysis by NMR spectroscopy.

II. Characterization of the material by NMR spectroscopy:

A. $^{13}C$ NMR

The $^{13}C$ NMR spectrum of the material was obtained for the purpose of determining the relative amounts of the $C_{18}$ and $C_3$ chains attached to the surface. The peak for the first carbon from the silicon atom, which is common to both the $C_3$ and $C_{18}$ chains, was four times as large as the peak for the eighteenth carbon from the silicon, which is only contained in the $C_{18}$ chains. The ratio of the peak areas revealed approximately a 3:1 mole ratio of $C_3$:$C_{18}$ on the surface. This finding confirmed that the propyltrichlorosilane reacted more quickly with the substrate surface than the octadecyl silane. This mole ratio would be expected to provide, in the silica gel provided with a monolayer according to this invention, the same chromatographic behavior as a monomeric phase. The reason is that, assuming the total coverage of $C_{18}$ and $C_3$ is about 7 µmol/m², a 3:1 mole ratio of $C_3$:$C_{18}$ would correspond to a $C_{18}$ coverage of about 2 µmol/m². This is a typical coverage for a silica gel chromatographic material to which has been bonded individual $C_{18}$ chains.

B. $^{29}Si$ NMR

The $^{29}Si$ NMR spectrum of the material was obtained for the purpose of determining the amounts of unreacted Si—OH bonds in the horizontally polymerized monolayer. Trifunctional silanes can give rise to multiple —OH groups on silicon atoms after the reaction is complete, and these groups can have a deleterious effect on the chromatographic performance. Providing a substituted monolayer in accordance with the present invention should result in fewer of these groups. Spectra were obtained for the material produced in Part I and for a conventional polymeric phase (Sander and Wise, Anal. Chem. Vol. 56, pp. 504–510 (1984). Based on interpretations published in the chemical literature, the peaks on the spectra that were obtained were assigned to the entities R—Si—(OH)$_2$, R—Si—OH and R—Si—O—Si. A comparison of these two spectra confirmed that the product from Part I has fewer groups with the structure R—Si—(OH)$_2$ than does the conventional polymeric phase.

III. Chromatographic performance of the material:

A. Retention behavior

Chromatograms were obtained using material according to the present invention, prepared in accordance with Part I, and for a conventional monomeric phase comprising the reaction product of chlorodimethyloctadecyl silane and silica gel refluxed in toluene and end-capped with chlorotrimethyl silane. The mobile phase was 70% methanol in water at 30° C., and the solutes toluene and benzyl alcohol were used. The chromatograms showed that the retention behavior is very similar for the two columns. This result is consistent with the NMR data.

Chromatograms were also obtained for the solutes benzo(a)pyrene and phenanthro[3,4-c]phenanthrene using a mobile phase of 85% acetonitrile in water. The retention order of these solutes has been reported to be reversed for monomeric and polymeric phases, thus constituting a test of whether the mixed phase has selectivity akin to a monomeric or polymeric phase. The retention order observed for the mixed column was the same as that for the monomeric phase and reversed from that of the polymeric phase. (In a "polymeric" phase, the silica gel is reacted with one compound of the formula $SiCl_3R$ under conditions such that a small amount of water is intentionally introduced to cause a small amount of polymerization of the silane. The resulting chains polymerize to form a chain of repeating —(Si—O)units which extends from the silica gel surface; no monolayer is present as in the present invention.) This result observed supports the idea that the chromatographic phase prepared in accordance with the present invention provides the type of selectivity that a monomeric phase provides.

B. Reproducibility

To determine the reproducibility of the preparation method, the procedure was followed for another batch of silica and silane reagent mixture. No special care had been taken to pipette exactly the same ratio of silanizing reagents as had been used for the previous batch, nor was special care taken to prepare quantitatively the same mobile phase composition. Instead, graduated cylinders were used for dispensing reagents and solvents. Chromatograms for the separately prepared batches were obtained; the averages of 5 runs for each column were within 1% of one another.

C. Stability to acid hydrolysis

To test the stability toward acid hydrolysis, a procedure used by a manufacturer of acid-stable chromatographic phases was adopted. The mobile phase composition was a mixture of 0.5% trifluoroacetic acid in acetonitrile, designated as A, and 0.5% trifluoroacetic acid in HPLC water, designated as B, with the percentages of A and B indicated in the Table below. The flow rate was 2.0 mL/min and the temperature was 50° C. The cycle used is tabulated below.

|  | Time (min) | (A) | (B) |
| --- | --- | --- | --- |
| (1) | 0.00–6.49 | 72% | 28% |
| (2) | 6.50–15.99 | 85% | 15% |
| (3) | 16.00–25.99 | 100% | 0% |
| (4) | 26.00–49.99 | 0% | 100% |
| (5) | 50.00–59.99 | 72% | 28% |

Loop back to 0.00 min.

A 100-hour run (which is 100 cycles of the tabulated loop) for the column according to the present invention prepared in accordance with Part I was completed for the tabulated programming of trifluoroacetic acid in water and acetonitrile, using the solute benzo(a)pyrene. Below is a tabulation of the retention time of benzo(a)pyrene after the specified number of hours of mobile phase cycling.

| Hours | Retention Time |
| --- | --- |
| 0 | 5.65 |
| 24 | 5.70 |
| 48 | 5.68 |
| 72 | 5.69 |
| 96 | 5.67 |

These data show that there is no change in retention time within the 1% noise on the measurement. The run was continued for another 24 hour period and there was still no change in the retention time. This stability is higher than any known $C_{18}$/silica phase, including both monomeric and polymeric phases.

D. Stability to base hydrolysis

Base hydrolysis is the most severe limitation of silica-based chromatographic phases. The stability to base hydrolysis of the column according to the present invention prepared in accordance with Part I was compared to that of the aforementioned conventional monomeric phase, which was end-capped with chlorotrimethylsilane to provide maximum stability. The mobile phase composition was 5% n-propanol in water, with NaOH added to make the pH approximately 12. (A pH of 12.4 at room temperature was measured using a pH meter.) The following cycling was used to monitor the stability to base hydrolysis. The flow rate was 2.0 mL/min and the temperature was 50° C.

(1) 20 minutes of 5% n-propanol at pH of nominally 12.
(2) 18 hours of HPLC water
(3) 20 minutes of 70% methanol in water
(4) Inject benzyl alcohol and toluene in 70% methanol in water; measure retention time
(5) Loop back to Step 1

The capacity factors (k') of benzyl alcohol and toluene after each cycle showed that the monomeric phase degraded more quickly than the phase according to the present invention. More significantly, during the second run of the base solution (step 1) for the monomeric column, the mobile phase was observed to become a milky color, which indicates that the silica substrate began dissolving. The pump pressure was observed to be increasing, therefore, the cycling was discontinued. These same observations were made for another monomeric column. By contrast, no such substrate degradation was observed for the mixed phase over the entire period of the study which included three loops through the cycle. Chromatograms could thus be obtained from a column according to the present invention even after exposure to a substantial volume of base.

Additional experiments showed that endcapping of the mixed phase provided further improvement in stability toward base hydrolysis. The preferred endcapping reagent is chlorotrimethyl silane; chlortri(isopropyl) silane, for example, can also be used.

What is claimed is:

1. A product comprising a silica gel or glass substrate to which is chemically bonded a monolayer of silicon atoms which are connected to other silicon atoms in said monolayer through oxygen atoms in said monolayer, wherein the monolayer is substituted with first and second hydrocarbyl substituents and each of the silicon atoms in said monolayer is substituted with said first hydrocarbyl substituent or said second hydrocarbyl substituent, wherein said first hydrocarbyl substituent is longer than said second hydrocarbyl substituent, and wherein the density of said hydrocarbyl substituents is at least 7 micromoles per square meter of substrate surface, wherein said product is formed by hydrating the surface of said substrate to form on said surface a monolayer of water, and then reacting said surface of said substrate with silanes of the formulas $R^1SiX_3$ and $R^2SiX_3$, wherein $R^1$ and $R^2$ are hydrocarbyl substituents and X is a leaving group, provided that $R^1$ is longer than $R^2$, under conditions under which said silanes react at said surface and form said monolayer of silicon atoms.

2. The product of claim 1 wherein said first and second hydrocarbyl substituents are distributed essentially uniformly on said substrate.

3. The product of claim 1 wherein said first hydrocarbyl substituent is selected from the group consisting of phenyl, alkyl containing 1 to 60 carbon atoms, monounsaturated alkylene containing 2 to 60 carbon atoms, epoxide, and derivatives of alkyl or monounsaturated alkylene which contain a total of up to 60 carbon atoms and which contain one or more hetero linkages selected from the group consisting of —O—, —N(R)—, —S—, —C(O)—, —SO—, —C(O)O—, —OC(O)—, —C(O)N(R)—, or —N(R)C(O)—; wherein the phenyl, alkyl, and alkylene are optionally substituted with one or more substituents selected from the group consisting of hydroxyl, halogen, cyano, nitro, —COOH, —SO,H, —N(R)(R), straight or branched alkyl containing 1 to 6 carbon atoms, and —$R^1Si(R^2)_{3-n}(OH)_n$ wherein n is 1, 2 or 3, $R^1$ and $R^2$ are alkyl, alkoxy or alkylene containing up to 6 carbon atoms, and R in each occurrence is hydrogen or alkyl containing 1 to 6 carbon atoms.

4. The product of claim 1 wherein said second hydrocarbyl substituent is selected from the group consisting of phenyl, alkyl containing 1 to 60 carbon atoms, monounsaturated alkylene containing 2 to 60 carbon atoms, epoxide, and derivatives of alkyl or monounsaturated alkylene which contain a total of up to 60 carbon atoms and which contain one or more hetero linkages selected from the group consisting of —O—, —N(R)—, —S—, —C(O)—, —SO$_2$—, —C(O)O—, —OC(O)—, —C(O)N(R)—, and —N(R)C(O)—; wherein the phenyl, alkyl and alkylene are optionally substituted with one or more substituents selected from the group consisting of hydroxyl, halogen, cyano, nitro, —COOH, —SO$_3$H, —N(R)(R), straight or branched alkyl containing 1 to 6 carbon atoms, and —$R^1Si(R^2)_{3-n}(OH)_n$ wherein n is 1, 2 or 3, $R^1$ and $R^2$ are alkyl, alkoxy or alkylene containing up to 6 carbon atoms, and R in each occurrence is hydrogen or alkyl containing 1 to 6 carbon atoms.

5. The product of claim 1 wherein the mole ratio of said first hydrocarbyl substituent to said second hydrocarbyl substituent on said substrate is 100:1 to 1:100.

6. A product according to claim 1 wherein said first hydrocarbyl substituent has the formula HOCH$_2$—CH(OH)CH$_2$—.

7. A product according to claim 1 wherein said substrate is bonded to the silicon atoms in said monolayer through oxygen atoms.

8. A product according to claim 1 comprising silica gel to which is chemically bonded a protective monolayer of silicon atoms which are connected to other silicon atoms in said monolayer through oxygen atoms in said monolayer, wherein the monolayer is substituted with first and second hydrocarbyl substituents and each of the silicon atoms in said monolayer is substituted with said first hydrocarbyl substituent or said second hydrocarbyl substituent, wherein said first hydrocarbyl substituent is longer than said second hydrocarbyl substituent.

9. The product of claim 8 wherein said first and second hydrocarbyl substituents are distributed essentially uniformly on said substrate.

10. The product of claim 8 wherein said first hydrocarbyl substituent is selected from the group consisting of phenyl, alkyl containing 1 to 60 carbon atoms, monounsaturated alkylene containing 2 to 60 carbon atoms, epoxide, and derivatives of alkyl or monounsaturated alkylene which contain a total of up to 60 carbon atoms and which contain one or more hetero linkages selected from the group of consisting of —O—, —N(R)—, —S—, —C(O)—, —SO—, —C(O)O—, —OC(O)—, —C(O)N(R)—, and —N(R)C(O)—; wherein the phenyl, alkyl and alkylene are optionally substituted with one or more substituents selected from the group consisting of hydroxyl, halogen, cyano, nitro, —COOH, —SO$_3$H, —N(R)(R), straight or branched alkyl containing 1 to 6 carbon atoms, and —$R^1Si(R^2)_{3-n}(OH)_n$, wherein n is 1, 2 or 3, $R^1$ and $R^2$ are alkyl, alkoxy or alkylene containing up to 6 carbon atoms, and R in each occurrence is hydrogen or alkyl containing 1 to 6 carbon atoms.

11. The product of claim 8 wherein said second hydrocarbyl substituent is selected from the group consisting of phenyl, alkyl containing 1 to 60 carbon atoms, monounsaturated alkylene containing 2 to 60 carbon atoms, epoxide, and derivatives of alkyl or monounsaturated alkylene containing a total of up to 60 carbon atoms and which contain one or more hetero linkages selected from the group of consisting of —O—, —N(R)—, —S—, —C(O)—, —SO—, —C(O)O—, —OC(O)—, —C(O)N(R)—, and —N(R)C(O)—; wherein the phenyl, alkyl and alkylene are optionally substituted with one or more substituents selected from the group consisting of hydroxyl, halogen, cyano, nitro, —COOH, —SO$_3$H, —N(R)(R), straight or branched alkyl containing 1 to 6 carbon atoms, and —$R^1Si(R^2)_{3-n}(OH)_n$ wherein n is 1, 2 or 3, $R^1$ and $R^2$ are alkyl, alkoxy or alkylene containing up to 6 carbon atoms, and R in each occurrence is hydrogen or alkyl containing 1 to 6 carbon atoms.

12. The product of claim 8 wherein the mole ratio of said first hydrocarbyl substituent to said second hydrocarbyl substituent on said substrate is 100:1 to 1:100.

13. The product of claim 8 wherein said first hydrocarbyl substituent contains 2 to 24 carbon atoms.

14. The product of claim 8 wherein said second hydrocarbyl substituent contains 1 to 6 carbon atoms.

15. The product of claim 8 wherein said first hydrocarbyl substituent is octadecyl and said second hydrocarbyl substituent is propyl.

16. The product of claim 8 wherein said first hydrocarbyl substituent is octadecyl and said second hydrocarbyl substituent is methyl.

17. The product of claim 8 wherein said first hydrocarbyl substituent is octyl and said second hydrocarbyl substituent is methyl.

18. The product of claim 8 wherein said first hydrocarbyl substituent is butyl and said second hydrocarbyl substituent is methyl.

19. The product of claim 8 wherein said first hydrocarbyl substituent occupies about 20 to about 50% of the surface of said substrate.

20. The product of claim 8 wherein the mole ratio of said first hydrocarbyl substituent to said second hydrocarbyl substituent is about 1:1 to about 1:4.

21. In the method of chromatographically separating a mixture of substances using a chromatographic material, the improvement wherein said material is a product according to claim 8.

22. In the method of chromatographically separating a mixture of substances using a chromatographic material, the improvement wherein said material is a product according to claim 9.

23. In the method of chromatographically separating a mixture of substances using a chromatographic material, the improvement wherein said material is a product according to claim 10.

24. In the method of chromatographically separating a mixture of substances using a chromatographic material, the improvement wherein said material is a product according to claim 11.

25. In the method of chromatographically separating a mixture of substances using a chromatographic material, the improvement wherein said material is a product according to claim 10.

26. In the method of chromatographically separating a mixture of substances using a chromatographic material, the improvement wherein said material is a product according to claim 13.

27. In the method of chromatographically separating a mixture of substances using a chromatographic material, the improvement wherein said material is a product according to claim 14.

28. In the method of chromatographically separating a mixture of substances using a chromatographic material, the improvement wherein said material is a product according to claim 15.

29. In the method of chromatographically separating a mixture of substances using a chromatographic material, the improvement wherein said material is a product according to claim 19.

30. In the method of chromatographically separating a mixture of substances using a chromatographic material, the improvement wherein said material is a product according to claim 20.

31. A product according to claim 1 comprising a glass surface to which is chemically bonded a protective monolayer of silicon atoms which are connected to other silicon atoms in said monolayer through oxygen atoms in said monolayer, wherein the monolayer is substituted with first and second hydrocarbyl substituents and each of the silicon atoms in said monolayer is substituted with a first hydrocarbyl substituent or a second hydrocarbyl substituent, wherein said first hydrocarbyl substituent is longer than said second hydrocarbyl substituent.

32. The product of claim 31 wherein said first and second hydrocarbyl substituents are distributed essentially uniformly on said substrate.

33. The product of claim 31 wherein said first hydrocarbyl substituent is selected from the group consisting of phenyl, alkyl containing 1 to 60 carbon atoms, monounsaturated alkylene containing 2 to 60 carbon atoms, epoxide, and derivatives of alkyl or monounsaturated alkylene which contain a total of up to 60 carbon atoms and which contain one or more hetero linkages selected from the group of consisting of —O—, —N(R)—, —S—, —C(O)—, —SO$_2$—, —C(O)O—, —OC(O)—, —C(O)N(R)—, and —N(R)C(O)—; wherein the phenyl, alkyl and alkylene are optionally substituted with one or more substituents selected from the group consisting of hydroxyl, halogen, cyano, nitro, —COOH, —SO$_3$H, —N(R)(R), straight or branched alkyl containing 1 to 6 carbon atoms, and —R$^1$Si(R$^2$)$_{3-n}$(OH)$_n$ wherein n is 1, 2 or 3, R$^1$ and R$^2$ are alkyl, alkoxy or alkylene containing up to 6 carbon atoms, and R in each occurrence is hydrogen or alkyl containing 1 to 6 carbon atoms.

34. The product of claim 31 wherein said second hydrocarbyl substituent is selected from the group consisting of phenyl, alkyl containing 1 to 60 carbon atoms, monounsaturated alkylene containing 2 to 60 carbon atoms, epoxide, and derivatives of alkyl or monounsaturated alkylene containing a total of up to 60 carbon atoms and which contain one or more hetero linkages selected from the group of consisting of —O—, —N(R)—, —S', —C(O)—, —SO—, —C(O)O—, —OC(O)—, —C(O)N(R)—, and —N(R)C(O)—; wherein the phenyl, alkyl and alkylene are optionally substituted with one or more substituents selected from the group consisting of hydroxyl, halogen, cyano, nitro, —COOH, —SO$_3$H, —N(R)(R), straight or branched alkyl containing 1 to 6 carbon atoms, and —R$^1$Si(R$^2$)$_{3-n}$(OH)$_n$ wherein n is 1, 2 or 3, R$^1$ and R$^2$ are alkyl, alkoxy or alkylene containing up to 6 carbon atoms, and R in each occurrence is hydrogen or alkyl containing 1 to 6 carbon atoms.

35. The product of claim 31 wherein the mole ratio of said first hydrocarbyl substituent to said second hydrocarbyl substituent on said substrate is 100:1 to 1:100.

36. The product of claim 31 wherein said first hydrocarbyl substituent contains 2 to 24 carbon atoms.

37. The product of claim 31 wherein said second hydrocarbyl substituent contains 1 to 6 carbon atoms.

38. The product of claim 31 wherein said first hydrocarbyl substituent is octadecyl and said second hydrocarbyl substituent is propyl.

39. The product of claim 38 wherein said first hydrocarbyl substituent occupies about 20 to about 50% of the surface of said substrate.

40. The product of claim 31 wherein the mole ratio of said first hydrocarbyl substituent to said second hydrocarbyl substituent is about 1:1 to about 1:4.

41. The method of rendering a silica gel or glass surface resistant to chemical and mechanical degradation which comprises forming on said surface a protective monolayer of silicon atoms which are connected to other silicon atoms in said monolayer through oxygen atoms in said monolayer, wherein the monolayer is substituted with first and second hydrocarbyl substituents and each of the silicon atoms in said monolayer is substituted with a first hydrocarbyl substituent or a second hydrocarbyl substituent, wherein said first hydrocarbyl substituent is longer than said second hydrocarbyl substituent, and wherein the density of said hydrocarbyl substituents is at least 7 micromoles per square meter of substrate surface;

wherein said protective monolayer is formed hydrating the surface of said substrate to form on said surface a monolayer of water, and then reacting said surface of said substrate with silanes of the formulas R$^1$SiX$_3$ and R$_2$SiX$_3$, wherein R$^1$ and R$^2$ are hydrocarbyl substituents and X is a leaving group, provided that R$^1$ is longer than R$^2$, under conditions whereunder said silanes react at said surface and form said monolayer of silicon atoms.

42. The method of claim 41 wherein said first hydrocarbyl substituent is selected from the group consisting of phenyl, alkyl containing 1 to 60 carbon atoms, monounsaturated alkylene containing 2 to 60 carbon atoms, epoxide, and derivatives of alkyl or monounsaturated alkylene which contain a total of up to 60 carbon atoms and which contain one or more hetero linkages selected from the group consisting of —O—, —N(R)—, —S—, —C(O)—, —SO$_2$—, —C(O)O—, —OC(O)—, —C(O)N(R)—, or —N(R)C(O)—; wherein the phenyl, alkyl, and alkylene are optionally substituted with one or more substituents selected from the group consisting of hydroxyl, halogen, cyano, nitro, —COOH, —SO$_3$H, —N(R)(R), straight or branched alkyl containing 1 to 6 carbon atoms, and —R$^1$Si(R$_2$)$_{3-n}$(OH)$_n$, wherein n is 1, 2 or 3, R$^1$ and R$^2$ are alkyl, alkoxy or alkylene containing up to 6 carbon atoms, and R in each occurrence is hydrogen or alkyl containing 1 to 6 carbon atoms.

43. The method of claim 41 wherein said second hydrocarbyl substituent is selected from the group consisting of phenyl, alkyl containing 1 to 60 carbon atoms, monounsaturated alkylene containing 2 to 60 carbon atoms, epoxide and derivatives of alkyl or monounsaturated alkylene which contain a total of up to 60 carbon atoms and which contain one or more hetero linkages selected from the group consisting of —O—, —N(R)—, —S—, —C(O)—, —SO$_2$—, —C(O)O—, —OC(O)—, —C(O)N(R)—, and —N(R)C(O)—; wherein the phenyl, alkyl and alkylene are optionally substituted with one or more substituents selected from the group consisting of hydroxyl, halogen, cyano, nitro, —COOH, —SO$_3$H, —N(R)(R), straight or branched alkyl containing 1 to 6 carbon atoms, and —R$^1$Si(R$^2$)$_{3-n}$(OH)$_n$ wherein n is 1, 2 or 3, R$^1$ and R$^2$ are alkyl, alkoxy or alkylene containing up to 6 carbon atoms, and R in each occurrence is hydrogen or alkyl containing 1 to 6 carbon atoms.

44. The method according to claim 41 wherein material having a glass surface is rendered resistant to chemical and mechanical degradation of said surface.

45. The method of claim 44 wherein said first hydrocarbyl substituent is selected from the group consisting of phenyl, alkyl containing 1 to 60 carbon atoms, monounsaturated alkylene containing 2 to 60 carbon atoms, epoxide, and derivatives of alkyl or monounsaturated alkylene which contain a total of up to 60 carbon atoms and which contain one or more hetero linkages selected from the group consisting of —O—, —N(R)—, —S—, —C(O)—, —SO—, —C(O)O—, —OC(O)—, —C(O)N(R)—, or —N(R)C(O)—; wherein the phenyl, alkyl, and alkylene are optionally substituted with one or more substituents selected from the group consisting of hydroxyl, halogen, cyano, nitro, —COOH, —SO$_3$H, —N(R)(R), straight or branched alkyl containing 1 to 6 carbon atoms, and —R$^1$Si(R$^2$)$_{3-n}$(OH)$_n$ wherein n is 1, 2 or 3, R$^1$ and R$^2$ are alkyl, alkoxy or alkylene containing up to 6 carbon atoms, and R in each occurrence is hydrogen or alkyl containing 1 to 6 carbon atoms.

46. The method of claim 44 wherein said second hydrocarbyl substituent is selected from the group consisting of phenyl, alkyl containing 1 to 60 carbon atoms, monounsaturated alkylene containing 2 to 60 carbon atoms, epoxide, and derivatives of alkyl or monounsaturated alkylene which contain a total of up to 60 carbon atoms and which contain one or more hetero linkages selected from the group consisting of —O—, —N(R)—, —S—, —C(O)—, —SO$_2$—, —C(O)O—, —OC(O)—, —C(O)N(R)—, and —N(R)C(O)—; wherein the phenyl, alkyl and alkylene are optionally substituted with one or more substituents selected from the group consisting of hydroxyl, halogen, cyano, nitro, —COOH, —SO$_3$H, —N(R)(R), straight or branched alkyl containing 1 to 6 carbon atoms, and —R$^1$Si(R$^2$)$_{3-n}$(OH)$_n$ wherein n is 1, 2 or 3, R$^1$ and R$^2$ are alkyl, alkoxy or alkylene containing up to 6 carbon atoms, and R in each occurrence is hydrogen or alkyl containing 1 to 6 carbon atoms.

47. The method of claim 44 wherein said material is selected from the group consisting of glassware, optical fiber, and capillaries.

48. The method of claim 47 wherein said material is a fiber optic filament.

49. The method of claim 41 wherein material having a silica gel surface is rendered resistant to chemical and physical degradation of said surface.

50. The method of claim 49 wherein said first hydrocarbyl substituent is selected from the group consisting of phenyl, alkyl containing 1 to 60 carbon atoms, monounsaturated alkylene containing 2 to 60 carbon atoms, epoxide and derivatives of alkyl or monounsaturated alkylene which contain a total of up to 60 carbon atoms and which contain one or more hetero linkages selected from the group consisting of —O—, —N(R)—, —S—, —C(O)—, —SO$_2$, —C(O)O—, —OC(O)—, —C(O)N(R)—, or —N(R)C(O)—; wherein the phenyl, alkyl, and alkylene are optionally substituted with one or more substituents selected from the group consisting of hydroxyl, halogen, cyano, nitro, —COOH, —SO$_3$H, —N(R)(R), straight or branched alkyl containing 1 to 6 carbon atoms, and —R$^1$Si(R$^2$)$_{3-n}$(OH)$_n$ wherein n is 1, 2 or 3, R$^1$ and R$^2$ are alkyl, alkoxy or alkylene containing up to 6 carbon atoms, and R in each occurrence is hydrogen or alkyl containing 1 to 6 carbon atoms.

51. The method of claim 49 wherein said second hydrocarbyl substituent is selected from the group consisting of phenyl, alkyl containing 1 to 60 carbon atoms, monounsaturated alkylene containing 2 to 60 carbon atoms, epoxide, and derivatives of alkyl or monounsaturated alkylene which contain a total of up to 60 carbon atoms and which contain one or more hetero linkages selected from the group consisting of —O—, —N(R)—, —S—, —C(O)—, —SO$_2$—, —C(O)O—, —OC(O)—, —C(O)N(R)—, and —N(R)C(O)—; wherein the phenyl, alkyl and alkylene are optionally substituted with one or more substituents selected from the group consisting of hydroxyl, halogen, cyano, nitro, —COOH, —SO$_3$H, —N(R)(R), straight or branched alkyl containing 1 to 6 carbon atoms, and —R$^1$Si(R$^2$)$_{3-n}$(OH)$_n$ wherein n is 1, 2 or 3, R$^1$ and R$^2$ are alkyl, alkoxy or alkylene containing up to 6 carbon atoms, and R in each occurrence is hydrogen or alkyl containing 1 to 6 carbon atoms.

52. A method for treating the surface of an article having a surface of silica gel or glass comprising hydrating said surface to form thereon a monolayer of water, and then reacting said surface with silanes of the formula R$^1$SiX$_3$ and R$^2$SiX$_3$, wherein R$^1$ and R$^2$ are hydrocarbyl substituents and X is a leaving group, provided that R$^1$ is longer than R$^2$, under conditions whereunder said silanes react at said surface and form a monolayer of silicon atoms chemically bonded to said surface which silicon atoms are connected to other silicon atoms in said monolayer through oxygen atoms in said monolayer, wherein each of said silicon atoms in said monolayer is substituted with R$^1$ or R$^2$ and wherein the density of said hydrocarbyl substituents in said monolayer is at least 7 micromoles per square meter of substrate surface.

53. The method according to claim 52 which comprises contacting said surface with said silanes in a solution of said silanes.

54. The method according to claim 52 which comprises contacting said surface of said article with a gas comprising said silanes.

55. A method according to claim 54 wherein said article is a fiber optic filament, the method comprising drawing said filament through said gas under conditions whereunder said silanes react with the surface of said filament.

* * * * *

UNITED STATES PATENT AND TRADEMARK OFFICE
CERTIFICATE OF CORRECTION

PATENT NO. : 5,599,625

DATED : February 4, 1997

INVENTOR(S) : Mary J. Wirth, et al.

Page 1 of 2

It is certified that error appears in the above-identified patent and that said Letters Patent is hereby corrected as shown below:

Column 1, line 4, insert the following paragraph: --This invention was made with Government support under Grant No. CHE-8814602 awarded by the National Science Foundation, and under Grant No. DE FG02-91ER14187 awarded by the Department of Energy. The Government has certain rights in the invention--

Column 4, line 21: "monoaklylamino" should read --monoalkylamino--

Column 10, line 51: "chlortri" should read --chlorotri--

Column 11, line 17, Claim 3: "SO" should read --$SO_2$--

Column 11, line 22, Claim 3: "SO,H," should read --$SO_3H$--

Column 12, line 8, Claim 10: "SO" should read --$SO_2$--

Col. 12, line 26, Claim 11: "SO" should read --$SO_2$--

Column 13, line 14, Claim 25: "claim 10" should read --claim 12--

Column 14, line 6, Claim 34: "-S'" should read -- -S- --

Column 14, line 6, Claim 34: "SO" should read --$SO_2$--

Column 14, line 27, Claim 39: "claim 38" should read --claim 31--

Column 14, line 46, Claim 41: after "formed" insert --by--

Column 14, line 50, Claim 41: "$R_2SiX_3$" should read --$R^2SiX_3$--

Column 15, line 1, Claim 42: "($R_2$)" should read --($R^2$)--

Col. 15, line 34, Claim 45, "SO" should read --$SO_2$--

UNITED STATES PATENT AND TRADEMARK OFFICE
CERTIFICATE OF CORRECTION

PATENT NO. : 5,599,625
DATED : February 4, 1997
INVENTOR(S) : Mary J. Wirth, et al.

It is certified that error appears in the above-indentified patent and that said Letters Patent is hereby corrected as shown below:

Column 16, line 12, Claim 50: "$SO_2$," should read --$SO_2$ --,--

Signed and Sealed this

Eleventh Day of August 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,599,625 C1
APPLICATION NO. : 90/008633
DATED : September 1, 2009
INVENTOR(S) : Mary J. Wirth et al.

Page 1 of 1

It is certified that error appears in the above-identified patent and that said Letters Patent is hereby corrected as shown below:

Column 1, line 18: "patentable as" should be replaced by --confirmed.--

Column 1, line 19: "amended" should be deleted.

Column 1, line 25 through column 3, line 19 should be deleted.

Signed and Sealed this

Fifteenth Day of December, 2009

David J. Kappos
*Director of the United States Patent and Trademark Office*

(12) EX PARTE REEXAMINATION CERTIFICATE (7035th)
United States Patent
Wirth et al.

(10) Number: US 5,599,625 C1
(45) Certificate Issued: Sep. 1, 2009

(54) PRODUCTS HAVING MULTIPLE-SUBSTITUTED POLYSILOXANE MONOLAYER

(75) Inventors: Mary J. Wirth, Elkton, MD (US); Hafeez O. Fatunmbi, Newark, DE (US)

(73) Assignee: University of Delaware, Newark, DE (US)

Reexamination Request:
No. 90/008,633, Jun. 15, 2007

Reexamination Certificate for:
Patent No.: 5,599,625
Issued: Feb. 4, 1997
Appl. No.: 08/455,875
Filed: May 31, 1995

Certificate of Correction issued Aug. 11, 1998.

Related U.S. Application Data

(63) Continuation of application No. 08/090,053, filed on Jul. 15, 1993, now abandoned, which is a continuation-in-part of application No. 07/900,215, filed on Jun. 17, 1992, now abandoned.

(51) Int. Cl.
*B01J 20/30* (2006.01)
*B01J 20/32* (2006.01)

(52) U.S. Cl. ............... 428/391; 73/23.35; 73/19.02; 210/656; 210/198.2; 95/88; 427/220; 427/287; 427/387; 427/299; 428/405; 428/447

(58) Field of Classification Search .............. None
See application file for complete search history.

(56) References Cited

U.S. PATENT DOCUMENTS

| | | | |
|---|---|---|---|
| 3,664,967 A | * 5/1972 | Stehl | 502/401 |
| 4,324,689 A | 4/1982 | Shah | |
| 4,874,518 A | 10/1989 | Kirkland et al. | |
| 5,133,895 A | 7/1992 | Ogawa et al. | |
| 5,154,822 A | 10/1992 | Simpson et al. | |
| 5,209,976 A | * 5/1993 | Ogawa | 428/391 |
| 5,225,274 A | 7/1993 | Ogawa et al. | |
| 5,272,094 A | * 12/1993 | Barker et al. | 436/518 |
| 5,370,991 A | * 12/1994 | Remold-O'Donnell | 435/6 |
| 5,716,705 A | * 2/1998 | Wirth et al. | 428/391 |

FOREIGN PATENT DOCUMENTS

EP 268243 A2 * 5/1988

OTHER PUBLICATIONS

Fairbank and Wirth, "Role of surface–adsorbed water in the horizontal polymerization of trichlorosilanes", Journal of Chromatography A, vol. 830, pp. 285–291, (1999).*

Wasserman, "The structure of self–assembled monolayers of alkylsiloxanes on silicon: A comparison of results from ellipsometry and low–angle X–ray reflectivity," J. Am. Chem. Soc., vol. 111, pp. 5852–5861, (1989).*

Wirth, M.J. and Fatunmbi, H.O..; "Spectroscopic and Chromatographic Characterization of a Self–Assembled Monolayer as a Stationary Phase", Chemically Modified Surfaces, 1994, pp. 203–209.

Xiang, Yang "Adsorption of Water on Silica Surface and its Affect on Horizontal Polymerization"; Thesis submitted to the Faculty of the University of Delaware, Spring 1995; pp. 1–70.

Fairbank, Robert William Peter; "Horizontally Polymerized Chromatographic Stationary Phases"; A dissertation submitted to the Faculty of the University of Delaware, Fall 1997; 122 pages.

Jones, K.; "Optimisation Procedure for the Silanisation of Silicas for Reversed–Phase High–Performance Liquid Chromotography"; Journal of Chromatography, 392 (1987), pp. 1–10.

Jones, K.; "Optimisation Procedure for the Silanisation of Silicas for Reversed–Phase High–Performance Liquid Chromotography"; Journal of Chromatography, 392 (1987), pp. 11–16.

Wirth, Mary J., et al., "Horizontal Polymerization of Mixed Trifunctional Silanes on Silica: A Potential Chromatographic Stationary Phase", Analytical Chemistry, vol. 64, No. 22, Nov. 15, 192, pp. 2783–2786.

Jaschke, M., et al.; "Structure of Alkyl and Perfluoroalky Disulfide and Azobenzenethiol Monolayers on Gold (111) Revealed by Atomic Force Microscopy"; J. Phys. Chem, 1996, 100; pp. 2290–2301.

Dorsey, John G., et al.; "The Molecular Mechanism of Retention in Reversed–Phase Liquid Chromatography"; Chemical Reviews, 1989, vol. 89, No. 2; pp. 331–346.

Fairbanks, R.W. Peter, et al.; "Use of Methyl Spacers in a Mixed Horizontally Polymerized Stationary Phase"; Analytical Chemistry, vol. 67, No. 21, Nov. 1, 1995; pp. 3879–3885.

Sander, Lane C., et al.; "Synthesis and Characterization of Polymeric C18 Stationary Phases for Liquid Chromatography"; Analytical Chemistry, vol. 56, No. 3, Mar. 1984; pp. 504–510.

Montgomery, Jr., Malcolm E., et al.; "Orientational Dynamics of a Hydrophobic Guest in a Chromatographic Stationary Phase: Effect of Wetting by Alcohol"; Analytical Chemistry, vol. 64, No. 10, May 15, 1992; pp. 1170–1175.

Wirth, Mary J., et al.; "Mixed Self–Assembled Monolayers in Chemical Separations"; Science, vol. 275, Jan. 3, 1997; pp. 44–47.

Fatunmbi, Hafeez O., et al; "29Si and 13C NMR Characterization of Mixed Horizontally Polymerized Monolayers on Silica Gel"; Analytical Chemistry, vol. 65, No. 15, Aug. 1, 1993; pp. 2048–2054.

D.E. Nelson, Memorandum re: Rockland Presentation from Mary Wirth, Jul. 9, 1992.

(Continued)

*Primary Examiner*—Alan Diamond

(57) ABSTRACT

A protective monolayer is formed on e.g. silica gel and glass surfaces comprising a monolayer of silicon and oxygen atoms which is substituted with first and second hydrocarbyl substituents.

OTHER PUBLICATIONS

Silberzan, P., et al., Silanation of Silica Surfaces. A New Method of Constructing Pure or Mixed Monolayers, Langmuir, 1991, 1647–1651, vol. 7.

Gee, M., et al., Hydrophobicity Effects in the Condensation of Water Films on Quartz, Journal of Colloid and Interface Science, Dec. 1990, 450–465, vol. 140 No. 2.

* cited by examiner

US 5,599,625 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–5, 7–20 and 31–53 are cancelled.

Claims 6 and 21–30 are determined to be patentable as amended.

New claims 56, 57 and 58 are added and determined to be patentable.

Claims 54 and 55 were not reexamined.

6. [A product according to claim 1] *A product comprising a silica gel or glass substrate to which is chemically bonded a monolayer of silicon atoms which are connected to other silicon atoms in said monolayer through oxygen atoms in said monolayer, wherein the monolayer is substituted with first and second hydrocarbyl substituents and each of the silicon atoms in said monolayer is substituted with said first hydrocarbyl substituent or said second hydrocarbyl substituent, wherein said first hydrocarbyl substituent is longer than said second hydrocarbyl substituent, and wherein the density of said hydrocarbyl substituents is at least 7 micromoles per square meter of substrate surface, wherein said product is formed by hydrating the surface of said substrate to form on said surface a monolayer of water, and then reacting said surface of said substrate with silanes of the formulas $R^1SiX_3$ and $R^2SiX_3$, wherein $R^1$ and $R^2$ are hydrocarbyl substituents and X is a leaving group, provided that $R^1$ is longer than $R^2$, under conditions under which said silanes react at said surface and form said monolayer of silicon atoms,* wherein said first hydrocarbyl substituent has the formula $HOCH_2$—CH(OH)CH$_2$—.

21. In the method of chromatographically separating a mixture of substances using a chromatographic material, the improvement wherein said material is a product [according to claim 8] *comprising a silica gel to which is chemically bonded a protective monolayer of silicon atoms which are connected to other silicon atoms in said monolayer through oxygen atoms in said monolayer, wherein the monolayer is substituted with first and second hydrocarbyl substituents and each of the silicon atoms in said monolayer is substituted with said first hydrocarbyl substituent or said second hydrocarbyl substituent, wherein said first hydrocarbyl substituent is longer than said second hydrocarbyl substituent, and wherein the density of said hydrocarbyl substituents is at least 7 micromoles per square meter of substrate surface, wherein said product is formed by hydrating the surface of said substrate to form on said surface a monolayer of water, and then reacting said surface of said substrate with silanes of the formulas $R^1SiX_3$ and $R^2SiX_3$, wherein $R^1$ and $R^2$ are hydrocarbyl substituents and X is a leaving group, provided that $R^1$ is longer than $R^2$, under conditions under which said silanes react at said surface and form said monolayer of silicon atoms*.

22. In the method of [chromatographically separating a mixture of substances using a chromatographic material, the improvement wherein said material is a product according to claim 9] *claim 21 wherein said first and second hydrocarbyl substituents are distributed essentially uniformly on said substrate*.

23. In the method of [chromatographically separating a mixture of substances using a chromatographic material, the improvement wherein said material is a product according to claim 10] *claim 21 wherein said first hydrocarbyl substituent is selected from the group consisting of phenyl, alkyl containing 1 to 60 carbon atoms, monounsaturated alkylene containing 2 to 60 carbon atoms, epoxide, and derivatives of alkyl or monounsaturated alkylene which contain a total of up to 60 carbon atoms and which contain one or more hetero linkages selected from the group of consisting of —O—, —N(R)—, —S—, —C(O)—, —SO$_2$—, —C(O)O—, —OC(O)—, —C(O)N(R)—, and —N(R)C(O)—; wherein the phenyl, alkyl and alkylene are optionally substituted with one or more substituents selected from the group consisting of hydroxyl, halogen, cyano, nitro, —COOH, —SO$_3$H, —N(R)(R), straight or branched alkyl containing 1 to 6 carbon atoms, and —$R^1Si(R^2)_{3-n}(OH)_n$, wherein n is 1, 2 or 3, $R^1$ and $R^2$ are alkyl, alkoxy or alkylene containing up to 6 carbon atoms, and R in each occurrence is hydrogen or alkyl containing 1 to 6 carbon atoms*.

24. In the method of [chromatographically separating a mixture of substances using a chromatographic material, the improvement wherein said material is a product according to claim 11] *claim 21 wherein said second hydrocarbyl substituent is selected from the group consisting of phenyl, alkyl containing 1 to 60 carbon atoms, monounsaturated alkylene containing 2 to 60 carbon atoms, epoxide, and derivatives of alkyl or monounsaturated alkylene containing a total of up to 60 carbon atoms and which contain one or more hetero linkages selected from the group of consisting of —O—, —N(R)—, —S—, —C(O)—, —SO$_2$—, —C(O)O—, —OC(O)—, —C(O)N(R)—, and —N(R)C(O)—; wherein the phenyl, alkyl and alkylene are optionally substituted with one or more substituents selected from the group consisting of hydroxyl, halogen, cyano, nitro, —COOH, —SO$_3$H, —N(R)(R), straight or branched alkyl containing 1 to 6 carbon atoms, and —$R^1Si(R^2)_{3-n}(OH)_n$, wherein n is 1, 2, or 3, $R^1$ and $R^2$ are alkyl, alkoxy or alkylene containing up to 6 carbon atoms, and R in each occurrence is hydrogen or alkyl containing 1 to 6 carbon atoms*.

25. In the method of [chromatographically separating a mixture of substances using a chromatographic material, the improvement wherein said material is a product according to claim 12] *claim 21 wherein the mole ratio of said first hydrocarbyl substituent to said second hydrocarbyl substituent on said substrate is 100:1 to 1:100*.

26. In the method of [chromatographically separating a mixture of substances using a chromatographic material, the improvement wherein said material is a product according to claim 13] *claim 21 wherein said first hydrocarbyl substituent contains 2 to 24 carbon atoms*.

27. In the method of [chromatographically separating a mixture of substances using a chromatographic material, the improvement wherein said material is a product according to claim 14] *claim 21 wherein said second hydrocarbyl substituent contains 1 to 6 carbon atoms*.

28. In the method of [chromatographically separating a mixture of substances using a chromatographic material, the improvement wherein said material is a product according to claim 15] *claim 21 wherein said first hydrocarbyl substituent is octadecyl and said second hydrocarbyl substituent is propyl.*

29. In the method of [chromatographically separating a mixture of substances using a chromatographic material, the improvement wherein said material is a product according to claim 19] *claim 21 wherein said first hydrocarbyl substituent occupies about 20 to about 50% of the surface of said substrate.*

30. In the method of [chromatographically separating a mixture of substances using a chromatographic material, the improvement wherein said material is a product according to claim 20] *claim 21 wherein the mole ratio of said first hydrocarbyl substituent to said second hydrocarbyl substituent is about 1:1 to about 1:4.*

*56. A product comprising a chromatographic silica gel substrate to which is chemically bonded a monolayer of silicon atoms which are connected to other silicon atoms in said monolayer through oxygen atoms in said monolayer, wherein the monolayer is substituted with first and second hydrocarbyl substituents and each of the silicon atoms in said monolayer is substituted with said first hydrocarbyl substituent or said second hydrocarbyl substituent, wherein said first hydrocarbyl substituent is longer than said second hydrocarbyl substituent, and wherein the density of said hydrocarbyl substituents is at least 7 micromoles per square meter of substrate surface, wherein said product is formed by hydrating the surface of said substrate to form on said surface a monolayer of water, and then reacting said surface of said substrate with silanes of the formulas $R^1SiX_3$ and $R^2SiX_3$, wherein $R^1$ and $R^2$ are hydrocarbyl substituents and X is a leaving group, provided that $R^1$ is longer than $R^2$, under conditions under which said silanes react at said surface and form said monolayer of silicon atoms.*

*57. The method of rendering a chromatographic silica gel surface resistant to chemical and mechanical degradation which comprises forming on said surface a protective monolayer of silicon atoms which are connected to other silicon atoms in said monolayer through oxygen atoms in said monolayer, wherein the monolayer is substituted with first and second hydrocarbyl substituents and each of the silicon atoms in said monolayer is substituted with a first hydrocarbyl substituent or a second hydrocarbyl substituent, wherein said first hydrocarbyl substituent is longer than said second hydrocarbyl substituent, and wherein the density of said hydrocarbyl substituents is at least 7 micromoles per square meter of substrate surface; wherein said protective monolayer is formed by hydrating the surface of said substrate to form on said surface a monolayer of water, and then reacting said surface of said substrate with silanes of the formulas $R^1SiX_3$ and $R^2SiX_3$, wherein $R^1$ and $R^2$ are hydrocarbyl substituents and X is a leaving group, provided that $R^1$ is longer than $R^2$, under conditions whereunder said silanes react at said surface and form said monolayer of silicon atoms.*

*58. A method for treating the surface of an article having a surface of chromatographic silica gel comprising hydrating said surface to form thereon a monolayer of water, and then reacting said surface with silanes of the formula $R^1SiX_3$ and $R^2SiX_3$, wherein $R^1$ and $R^2$ are hydrocarbyl substituents and X is a leaving group, provided that $R^1$ is longer than $R^2$, under conditions whereunder said silanes react at said surface and form a monolayer of silicon atoms chemically bonded to said surface which silicon atoms are connected to other silicon atoms in said monolayer through oxygen atoms in said monolayer, wherein each of said silicon atoms in said monolayer is substituted with $R^1$ or $R^2$ and wherein the density of said hydrocarbyl substituents in said monolayer is at least 7 micromoles per square meter of substrate surface.*

\* \* \* \* \*